G. E. HAYES.

Vulcanizing Vessel.

No. 3,140. Reissued Sept. 29, 1868.

Witnesses

C. M. Davis

C. B. Forbush

Inventor

Geo. E. Hayes

N. PETERS, Photo-Lithographer, Washington, D. C.

United States Patent Office.

GEORGE E. HAYES, OF BUFFALO, NEW YORK.

*Letters Patent No.* 31,599, *dated March* 5, 1861; *reissue No.* 3,140, *dated September* 29, 1868.

IMPROVED VULCANIZING-VESSEL.

The Schedule referred to in these Letters Patent and making part of the same.

TO ALL WHOM IT MAY CONCERN:

Be it known that I, GEORGE E. HAYES, of the city of Buffalo, in the county of Erie, and State of New York, have invented new and useful Improvements in the Construction and Use of Vulcanizing-Vessels, for vulcanizing rubber compound, and other vulcanizable gums and compounds, for artificial teeth and other purposes; and I do hereby declare that the following is a full and exact description of the construction and operation of the same, reference being had to the accompanying drawing, making a part of this specification, and in which—

Figure 1:
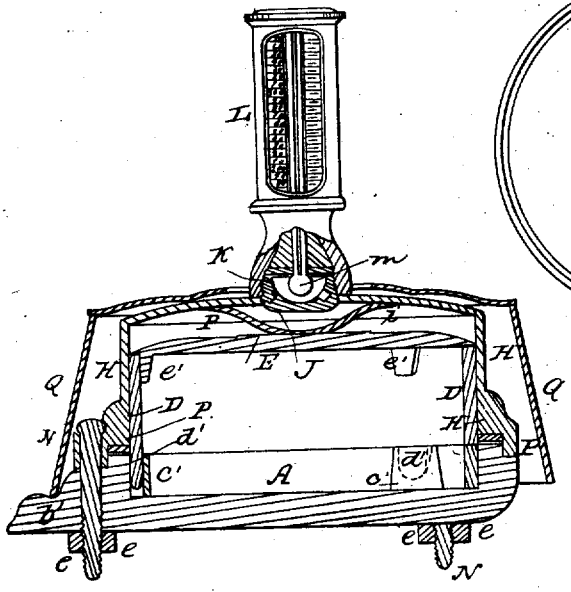

Figure 1 is a vertical section of a vulcanizing-vessel constructed according to my invention.

Figure 2:
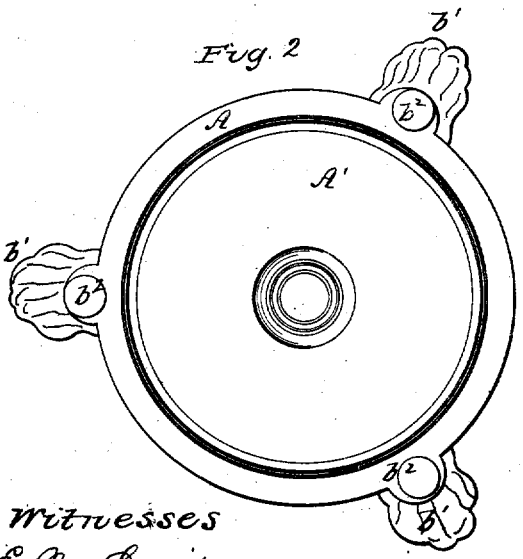

Figure 2, a plan of the bottom or lower section thereof.

Figure 3:
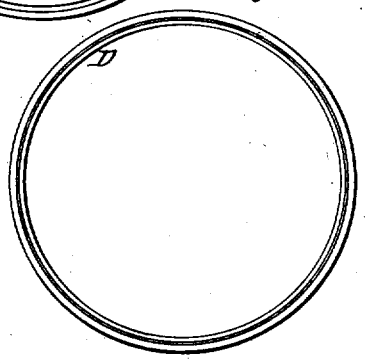

Figure 3, a plan of a band used to surround the plaster.

Figure 4:
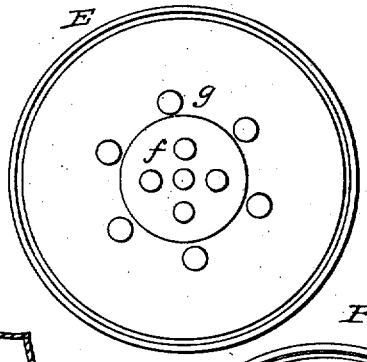

Figure 4, a plan of a top or cover to said band; and

Figure 5:
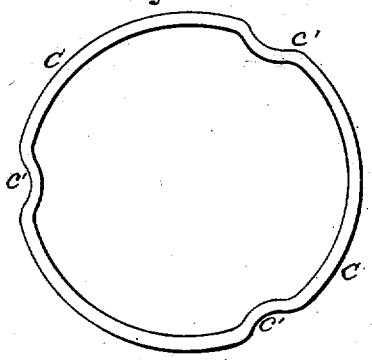

Figure 5 a plan of an open ring, which sits within the lower section.

Prior to this, my invention, vulcanizing-vessels for, say, by way of example, dental work, had either been connected, by branch or pipe, with a separate vessel, in which steam was generated to effect the vulcanization, or had been provided with a lower steam-generating vessel, as a direct attachment, as it were, and in which water was placed, but which formed a distinct device or chamber from the vulcanizing-vessel or case, perforations or other suitable openings, in some instances through an interposed plate or intermediate section, being established, to pass the steam to the vessel or chamber in which was located the mould containing the rubber compound; or, if single chambers were used, water had to be put into the vessel with the flask, the bottom not being sufficiently flat and rigid to transmit the heat to the flask without some intermediate conductor, and provision was usually made to keep the flask out of the water. To these constructions and modes of working vulcanizing-vessels there are serious objections, and, though the direct attachment of a steam-generating device or chamber below the vulcanizing-vessel has advantages over the other method or arrangement of a separate steam-generator, also hereinbefore referred to, the same is objectionable, firstly, in the insertion of the mould from above, through a lid or cover, to the vulcanizing-vessel proper, which made it difficult so to adjust the mould as that it would be equally on the base of the vessel, to secure perfect and regular vulcanization throughout, and equal exposure to the steam, fragments of dirt or plaster unavoidably lying on the base, and which, where the lid or opening was at the top, were difficult to remove, and sometimes even to see.

Such construction of vulcanizing-vessels was also objectionable on account of the number of sections, including the lid and steam-generating chamber, the warping or change of shape taking place in the surface under which was arranged the lamp or heater, by reason of the pressure of the steam, and which gave an irregular or unlevel character to the mould-seat, and the waste of heat by the indirect application of it to the mould or base carrying the same.

These and other defects my improvements obviate; and my invention consists—

Firstly, in making the vulcanizing-vessel proper, or oven, irrespective of its interior linings or fittings, of but two main sections, forming, when united, a vessel of bell-like character, consisting of an upper or enclosing-section, constituting the body of the vessel, as distinguishable from a mere lid, and rigid base-piece or lower section, to support the mould, which construction not only simplifies structure, but facilitates examination and cleaning of the base on which the mould rests, and adjustment of the latter thereon.

Secondly, in so constructing and using a vulcanizing-vessel as that the plaster mould, containing the rubber compound, shall lie upon the bottom of said vessel, and the heat from the lamp or other heater be applied directly to the bottom of the vessel upon which the mould lies, thereby securing a close proximity of the mould and rubber compound with the heated vessel, which construction and use enable me to dispense with water within the vulcanizing-vessel as a heating-medium, as heretofore used, other than that combined with the plaster mould, and also allows the vulcanizing-process to be completed with a less quantity of heat than heretofore, and in less time.

Thirdly, the invention consists in the construction and use of a mercury-chamber, in which to place the bulb of the thermometer, so that the degrees of heat may be correctly indicated without incurring the danger and inconvenience of placing the bulb within a steam-chamber, as heretofore. And Fourthly, the invention consists in the use of an open ring, in connection with the vulcanizing-vessel, for the purpose of facilitating the removal of the plaster from said vessel, the plaster being allowed to come in direct contact with the bottom of the vessel during the vulcanizing-process, and in the arrangement of a spring therewith.

Referring to the accompanying drawing, A (figs. 1 and 2) represents the base or lower section of the vulcanizing-vessel or oven, the same being of a flattened form, and of a rigid character, to prevent warping or change of shape, through the pressure to which it is subjected, by making it, say, of cast iron of suitable thickness. This bottom or base-piece is preferably of a circular form, of suitable diameter, and so constructed as to form a circular basin, A′, of, say, half an inch, more or less, in depth, to a diameter of about four and a quarter inches. For these sizes, it may be about three-eighths of an inch in thickness, more or less. It may have three legs or feet, $b^1$, with holes, $b^2$, therein, through which to pass the bolts from the upper or body-section H, these two sections forming the vulcanizing-vessel or oven, which thus is of a bell-like character, having its opening and closing joint, for insertion of the mould, at or near the bottom.

C, fig. 5, is an open ring, of cast iron, about, say, half an inch in thickness, and of such diameter as will allow it to sit within the basin, already described. It has three slight depressions or recesses, as shown at $c'$, to admit the lugs projecting from the edge of a band, D. This band D, fig. 3, is also of cast iron, about, say, one inch in width, and of equal diameter (or nearly so) with the basin A′ of the lower section of the vulcanizing-vessel. It has three projecting lugs $d'$, which pass into the depressions $c'$, as shown in fig. 1.

E, fig. 4, is a top plate or cover to the band D. It is made of cast iron, with three projecting ribs, which pass inside of the band D, two of which are shown at $e'$, fig. 1. It has a slight circular emboss upon its upper face, as shown at $f$, with several countersinks, as shown at $g$.

H, fig. 1, is the upper and enclosing or body-section of the vulcanizing-vessel, the same being made of a suitable thickness of metal, and, where a separate band, D, with its cover E and open ring C, is used, of a diameter a little larger than the band D, and of a depth which exceeds the width of said band and cover, so that it may enclose these parts, leaving sufficient room for a spring, F, to press upon the cover E, as shown in the drawing. One end of this spring F is made fast to the upper section H of the vessel, upon its inside, as shown at $i$, while the other end is left free, the middle of the spring pressing upon the cover E.

The object of this spring is to hold the parts C, D, and E (with the mould) securely in their proper places during the vulcanizing-process.

A knob or protuberance, J, is formed on the top of the upper or body-section H, in which is a mercury-chamber, K. A screw-thread is cut on the outside of this knob, so that the thermometer L may be screwed thereon, and allow the bulb $m$ to hang in the chamber, in mercury or other fluid, as shown in the drawing.

This arrangement enables me to use the thermometer entirely separate from a steam-chamber. It also enables me to use a thermometer more safely and conveniently than where it is connected with the steam-chamber. It can be removed and laid by in a safe place, when not in use.

Bolts, N, are connected with the upper section, and made to pass through the holes $b$ in the base-section A of the vessel, with nuts $e$, to hold the two parts firmly secured together.

Rubber packing, P, may be used between the two sections A and H, so that no steam or water can escape from the mould while the vulcanizing-process is going on.

Q is a jacket, made, say, of galvanized iron, which may be used to set over the upper or body-section H of the vulcanizing-vessel or oven, and made to rest upon the bottom or base-section A, as represented.

To use the vulcanizing-vessel as thus constructed and fitted, or provided, I first place the narrow ring C within the basin A′. The mould is placed in this ring, lying upon the bottom of the basin A′, and the interstices filled with plaster even with the top of the ring. The wide band D is then properly placed and fitted with plaster, to form the upper section of the mould. The latter being ready, the rubber compound is introduced in the ordinary or any suitable way. After this, the upper section H is secured to the bottom or lower section A, by means of the bolts and nuts before described, the spring F resting upon the cover E. Heat is then applied to the lower section or rigid bottom, A, of the vessel till the thermometer marks a degree somewhere, say, from 300° to 330° Fahrenheit. If kept at about the latter temperature forty-five minutes, or thereabouts, the rubber should be perfectly vulcanized. When done, the whole vessel may be immersed in water, and the bolts uniting the sections unscrewed.

What is here claimed, is—

1. A vulcanizing-vessel or oven, having its opening and closing joint, for insertion and removal of the mould, at or near the bottom, by making it of two main sections, the upper or enclosing one of which forms the body of the vessel, while its lower section constitutes a base thereto, substantially as specified.

2. So constructing a vulcanizing-vessel, with a flattened bottom, as that the plaster mould, containing the rubber compound, shall be in contact with the inside of the lower part of the vessel, so that the heat from the lamp or other heater shall be applied directly to that part of the vessel upon which the mould lies, substantially as and for the purposes set forth.

3. A mercury-chamber, formed in the upper section of the vulcanizing-vessel, the same being constructed and arranged with the thermometer, essentially as described.

4. The open ring C, in combination with the bottom, A, band D, and cover E, substantially as specified.

GEO. E. HAYES.

Witnesses:

J. E. Robie, Jr.,

Chas. B. Brown.